United States Patent [19]

Deutner et al.

[11] 3,886,050
[45] May 27, 1975

[54] PROCESS FOR THE PREPARATION OF PURE PHTHALIC ANHYDRIDE

[75] Inventors: Wolfgang Deutner; Robert Neumann, both of Linz, Donau, Austria

[73] Assignee: Chemie Linz AG, Linz, Austria

[22] Filed: Aug. 1, 1969

[21] Appl. No.: 846,673

[30] Foreign Application Priority Data
Aug. 2, 1968    Austria .............................. 7534/68
Oct. 31, 1968   Austria ............................ 10606/68

[52] U.S. Cl. .................. 203/80; 260/346.7; 203/91
[51] Int. Cl. ............................................. B01d 3/10
[58] Field of Search .............. 203/80, 77; 260/346.7

[56] References Cited
UNITED STATES PATENTS
2,574,644   11/1951   Landau ........................... 260/346.7
2,670,325   2/1954    Wesh et al. ...................... 260/346.7
2,786,805   3/1957    Sullivan et al. .................. 260/346.7
3,187,016   6/1965    Brown et al. .................... 260/346.7
3,380,896   4/1968    Scheiber et al. ...................... 203/77

*Primary Examiner*—Norman Yudkoff
*Assistant Examiner*—David Edwards
*Attorney, Agent, or Firm*—Wenderoth, Lind & Ponack

[57] ABSTRACT

The crude product obtained by oxidation of o-xylene or naphtalene is freed from products of lower boiling point by distillation under reduced pressure, subsequently thermally treated in the presence of sump product from subsequent distillation step and freed from higher boiling impurities by distilling off the pure phthalic anhydride from said higher boiling impurities under reduced pressure.

3 Claims, 1 Drawing Figure

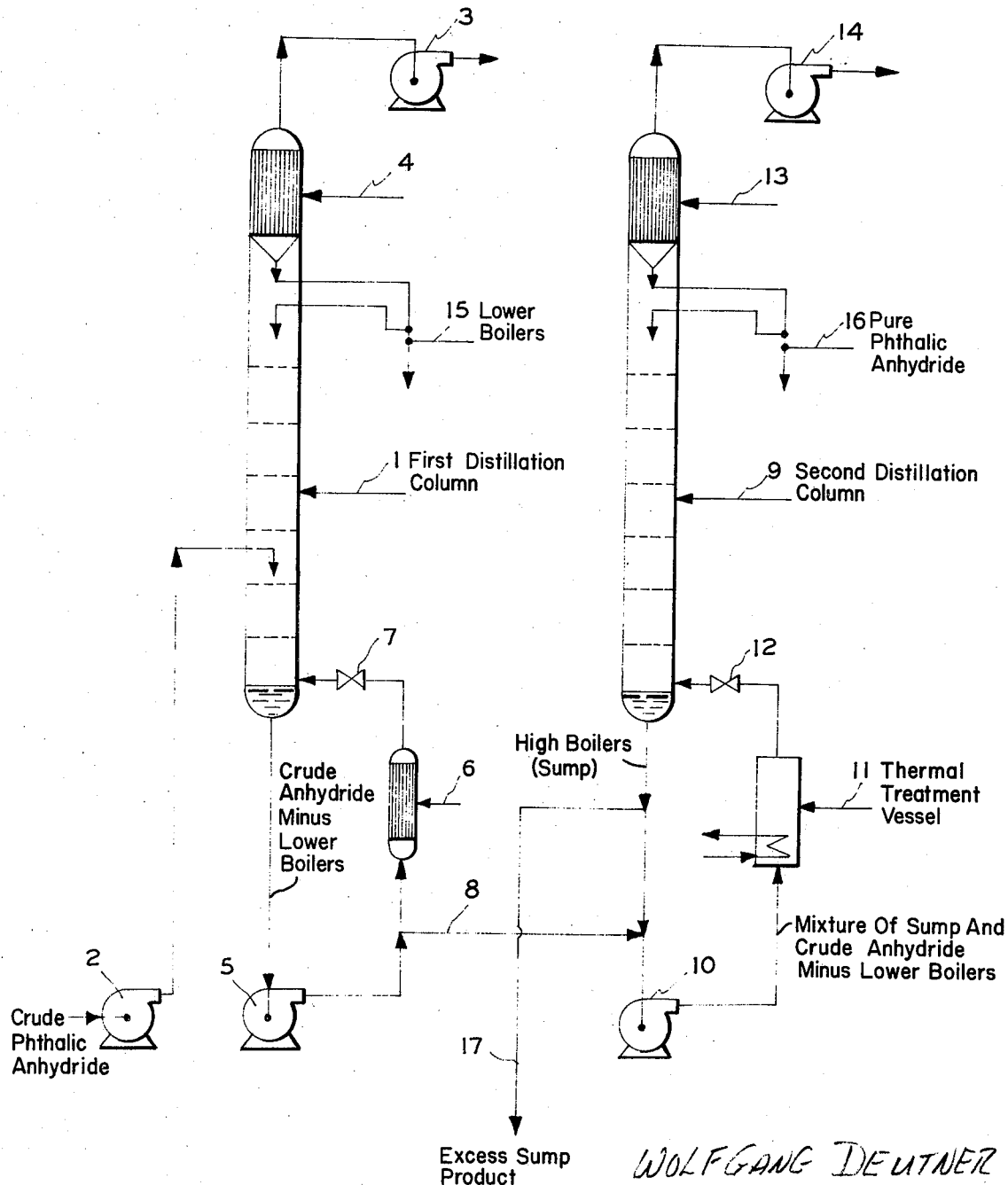

PROCESS FOR THE PREPARATION OF PURE PHTHALIC ANHYDRIDE

This invention relates to a process for the preparation of pure phthalic anhydride.

It is known that crude phthalic anhydride which has been prepared by oxidation of o-xylene or naphthalene with air contains impurities such as maleic acid, fumaric acid, phthalide, benzoic acid, and naphthoquinone. In the known processes, the crude product is subjected to a thermal treatment (ageing) at a temperature from 190° to 275°C., before distillation. If possible, this ageing process is carried out in the presence of an acid or alkali as a condensation agent. This ageing may also be effected continuously in stirrer vessel cascades as described in German Pat. Specification No. 1,259,870. About 5 to 20 hours are required for this. Finally the aged crude product is distilled.

In other known processes (German Pat. Specifications Nos. 1097427 and 1167810) the final distillation is carried out in several stages in a vacuum where in the first stage a maximum of 25% by weight is separated as a preliminary fraction at a pressure of 20 to 200 mm Hg and at a temperature not exceeding 225°C. and in the second distillation stage the main quantity of phthalic anhydride is obtained as distillate.

During the continuous distillation slight incrustation occurs on the vessel wall especially at the heating surfaces. In order to obviate this disadvantage thin layer evaporator zones as described in French Pat. Specification No. 1523711, in which less than 60% by weight of the product is evaporated may be used.

In another known process the thermal treatment of phthalic anhydride was said to be detrimental to the quality of the product and therefore unnecessary. Thus it was considered that the amount of volatile impurities are not lessened during the ageing process but are increased by cracking reactions. This teaching has not been substantiated, since it is uncertain whether these disadvantages occur with extra long treatment periods and extra high temperatures in the presence of sulphuric acid, that is to say in conditions hardly used in practice hitherto.

In accordance with the present invention there is provided a process for the preparation of pure phthalic anhydride from a crude product obtained by oxidising o-xylene or naphthalene in air, thermally treating the crude product and distilling the resultant mixture in at least two-stages under reduced pressure, which process comprises adding to the crude product during the thermal treatment the sump product from the subsequent distillation and distilling pure phthalic anhydride from the impurities with a higher boiling point.

Surprisingly the treatment time can be substantially shortened by the use of the distillation sump product in the thermal treatment. The ageing can also be conducted at a substantially lower temperature. At the same time the phthalic anhydride obtained is hardly discoloured even under prolonged heating, as is obvious from the low hot "Haze" number. Apparently the condensation products obtained in the distillation sump cause an acceleration of the ageing process, which consists substantially in a conversion of volatile impurities into non-volatile form.

Although the process of this invention may be effected in a non-continuous manner, it is advantageous to work continuously. The amount of sump product added to the crude phthalic anhydride during the thermal treatment may be varied between wide limits, for example from 1.1 to 300 parts by weight per part by weight of the crude phthalic anhydride. In most cases, however, the addition of at least 50 parts by weight of sump product per part by weight of crude phthalic anhydride is recommended. Preferably 100 to 200 parts by weight of distillation sump product are added to the crude phthalic anhydride. The maximum amount can be easily ascertained by experiment. The addition of the sump product may be made right at the beginning of the thermal treatment, but it may also be made even just before the end or in the last stages of an ageing process carried out in a cascade.

It is particularly advantageous to remove components of lower boiling point than phthalic anhydride as far as possible before the addition of the sump product. The thermal treatment is carried out generally at a temperature between 150° and 280°C, preferably between 210° and 250°C. Here a pressure is preferred which is at least the same as the vapour pressure of the mixture at the treatment temperature, which is with advantage, however, 20 to 2000, or preferably 20 to 200 mm Hg higher. In doing this, impurities are prevented from escaping with the evaporating phthalic anhydride and thus from being drawn into the ageing process. The treatment time may vary widely, for example from a few seconds to several hours. In so far as care is taken that the crude product is mixed with a large amount of sump distillation product, for example with 100 to 200 parts by weight per part of crude product, the process can be effected within an extremely short treatment time of a few seconds and also in very small treatment vessels, which must, of course, be provided appropriately with correspondingly large heating surfaces. As far as the process is effected at a higher pressure than the vapour pressure of the mixture the thermal energy contained in the mixture is more than sufficient to supply the heat required for the subsequent main distillation of pure phthalic anhydride. In this way the treated mixture, with advantage, may be released directly into a distillation column, the pure phthalic anhydride may be separated at the head, and the sump product passed together with further crude products (liberated from components with boiling points lower than phthalic anhydride) to the treatment zone. In this manner the heat exchangers which are usually mounted at the foot of the distillation column and which cause trouble and tend to become encrusted are obviated.

Both pre-distillation involving the separation of the components of low boiling point and the main distillation involving the separation of the pure phthalic anhydride from the sump product, can be effected in otherwise normal conditions, that is to say, the pre-distillation may be conducted at a pressure between 220 and 550 mm Hg and a temperature between 230° and 270°C, and the main distillation may be conducted at a pressure between 125 and 280 mm Hg and a temperature between 200° and 240°C.

The most advantageous way for working up the crude phthalic anhydride obtained from the oxidation of o-xylene comprises first freeing the crude phthalic anhydride from the impurities of low boiling point by distillation at a pressure from 220 to 550 mm Hg and a temperature of 230° to 270°C, and finally thermally treating the product for a few seconds at a temperature between 150° and 280°C. and a pressure, which is 20 to 200 mm Hg higher than the vapour pressure of the mixture, in the presence of 100 to 200 parts of the sump product of the subsequent main distillation. After this in a subsequent distillation at about 125 to 280 mm Hg the pure phthalic anhydride is distilled from the residues with a high boiling point and the product falling into the sump of this distillation stage, which product contains the impurities of high boiling point, is fed back in appropriate quantities into the thermal treatment, while a further part of this sump product is drained off.

The accompanying drawing illustrates an apparatus, which is suitable for carrying out a preferred embodiment of the process.

In the accompanying drawing crude phthalic anhydride which may have had a previous thermal treatment or may have come direct from the reactor is conveyed into a column 1 by a pump 2. The column 1 is a plate type column which is supplied at the top with a vacuum pump 3 and cooling means 4. The vacuum pump 3 produces the necessary vacuum in the column. The head product of the column, containing the components with a lower boiling point than phthalic anhydride, is separated at 15. The sump of column 1 is fitted with an arrangement for recycling evaporated components consisting of a pump 5, a heat exchanger 6 and a valve 7, which maintains the heat exchanger under a higher pressure than that existing in the body of the distillation column. In this way encrustations in the heat exchanger are avoided. The product leaving this distillation stage is mixed via a pipe 8 with the sump product of a second column 9 and is fed by a pump 10 into a thermal treatment vessel 11, maintained under increased pressure by the valve 12, from where it is led into the column 9 through the valve 12. This column, again a plate type column, is also fitted with a cooler 13 and a vacuum pump 14. The cleaned phthalic anhydride is drawn off at 16, while that portion of the sump product which is not recycled into the thermal treatment is sluiced away through pipe 17.

This preferred embodiment of the process thus makes a separate long heating up to the temperatures of the pre-treatment with subsequent partial cooling before introduction into the distillation for the separation of the first-fractions, as was hitherto usual, no longer necessary and ensures a complete utilisation of the heat, which was used for the pre-treatment in the main distillation. The energy saved by this amounts to more 50,000 kcal/ton PSA which means a considerable economic advantage.

The following Example illustrates the process of the present invention and the manner in which it may be performed:

Example

Into the lower part of a distillation column (1), which is formed as a plate type column, with a diameter of 600 mm. there is fed by means of a pump (2), 1,500 kg. per hour of a crude phthalic anhydride obtained from the oxidation of o-xylene. At this point the product temperature is between 140° and 200°C. The crude phthalic anhydride with a content of approximately 97% phthalic anhydride still contains as impurities varying amounts of benzoic acid, maleic acid anhydride, toluic acid, phthalide and water. A pressure of 250 mm Hg is maintained at the head of the distillation column by means of vacuum pump (3). At a column temperature of 250° to 260°C. approximately 10 kg. of the first fraction, consisting of 90% benzoic acid, are distilled per hour. The residue consists mainly of maleic acid anhydride and phthalic anhydride. The water contained in the crude phthalic anhydride is not condensed and is drawn off into the vacuum pump. The column works, in this connection, with a reflux of about 750 kg. phthalic anhydride/hour. The extraction of the first fraction at 15 may be effected continuously or discontinuously.

The sump product of the column is stirred up by means of a stirring pump 5 and passed through a heat exchanger to transfer the necessary amount of heat. In order to obviate premature evaporation and with it encrustations in the heat exchanger a valve 7 is so arranged that there is a pressure in the heat exchanger of 150 mm Hg greater than in the column.

The sump product from this first column with a residual portion of about 0.5% is mixed at a ratio of 1:160 with the sump product of a second column 9 which contains 20 to 25% residue. The second column is also a plate type column with a diameter of 1000 mm. The mixture is led via a pump 10 into a cylindrical thermal treatment vessel 11 provided with heating surfaces. In this vessel at a pressure of 300 mm Hg a temperature of 237°C. is set up in the upper end. The residence time in the vessel is about 3 seconds. The thermally treated product is released from this vessell through a valve 12 into the second column 9, in which, by means of vacuum pump 14, a pressure of 150 mm Hg is maintained in the column. From this results a column temperature of 227°C. In this column there is obtained a reflux of 600 kg. phthalic anhydride per hour.

In the second column there is distilled from the head the pure phthalic anhydride at 16, which has a melting point of about 131.0°C. a colour of 10 Haze, a hot haze-number of at least 20 and a content of phthalic anhydride of 99.8%.

The sump of the second column contains all the impurities having a higher boiling point than phthalic anhydride. In order to maintain a suitable content about 30 kg/hour are continuously or discontinuously sluiced away, while the main amount is mixed with the sump product of the first column.

1. A process for purifying crude phthalic anhydride obtained by oxidizing o-xylene or naphthalene with air, which comprises (1) distilling from the crude product, under reduced pressure, components of lower boiling point than phthalic anhydride, (2) adding to the resultant product the sump product of step 4 in an amount of at least 50 parts by weight per part by weight of the crude phthalic anhydride, (3) thermally treating the resultant mixture at a pressure which is at least equal to the vapor pressure of the mixture, thereby preventing boiling of the mixture, and (4) distilling, under reduced pressure, pure phthalic anhydride from the mixture, thus leaving as sump product impurities having a higher boiling point than phthalic anhydride.

2. The process according to claim 1, in which the amount of sump product added is 100 to 200 parts by weight per part by weight of crude phthalic anhydride.

3. A process for purifying crude phthalic anhydride obtained by oxidizing o-xylene or naphthalene with air, which comprises (1) distilling from the crude product, at an absolute pressure between 220 and 550 mm mercury and a temperature between 230° and 270°C, components of lower boiling point than phthalic anhydride, (2) adding to the resultant product the sump product of step 4, (3) thermally treating the resultant mixture for a few seconds at a temperature between 150° and 280°C and a pressure between 20 and 200 mm mercury higher than the vapor pressure of the mixture, thereby preventing boiling of the mixture, and in admixture with 100 to 200 parts by weight of the sump product of step 4 per part by weight of crude phthalic anhydride, and (4) distilling, at an absolute pressure of 125 to 280 mm mercury, pure phthalic anhydride from the mixture, whereby the pure phthalic anhydride is separated as head product of the distillation, thus leaving as sump product impurities having a higher boiling point than phthalic anhydride.

* * * * *